United States Patent

O'Bara

[15] 3,681,467
[45] Aug. 1, 1972

[54] BROMOPHENOL ISOMERIZATION

[72] Inventor: Edward John O'Bara, Manville, N.J.

[73] Assignee: American Cyanamid Company, Stamford, Conn.

[22] Filed: April 25, 1968

[21] Appl. No.: 724,282

[52] U.S. Cl. ........................ 260/623 R, 260/623 H
[51] Int. Cl. ............................................ C07c 39/26
[58] Field of Search ............... 260/623, 623 H, 623 R

[56] References Cited

UNITED STATES PATENTS 2,716,139  8/1955  Dietzler ........................ 260/623
3,293,309  12/1966  Zembra ........................ 260/623
3,449,443  6/1969  Dietzler ........................ 260/623

FOREIGN PATENTS OR APPLICATIONS 784,782  5/1968  Canada ........................ 260/623

*Primary Examiner*—Bernard Helfin
*Assistant Examiner*—W. B. Lone
*Attorney*—Theodore C. Virgil

[57] ABSTRACT

A process for enriching the ortho bromo isomer content of a phenolic material characterized by the presence of at least one brominated phenol and a bromine content of less than two atoms of bromine for each of phenolic nucleus. The phenolic material may particularly consist of at least one monobrominated and/or dibrominated product of a compound of the formula:

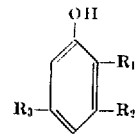

wherein $R_1$, $R_2$ and $R_3$ are hydrogen or primary or secondary alkyl groups containing one to four carbon atoms. The process is characterized by isomerization and/or disproportionation of the starting material in the presence of hydrogen bromide and an inert solvent, (such as a chlorinated hydrocarbon or a nitro aromatic hydrocarbon), at a temperature in the range $-25°$ to $60°$ C. for a period of time sufficient to obtain a high concentration of the desired ortho bromo isomer. The isomerization of the bromination products of m-cresol to obtain 6-bromo-m-cresol is particularly described.

10 Claims, No Drawings

BROMOPHENOL ISOMERIZATION

This invention relates to the preparation of phenolic compounds having a bromo substituent in a position ortho to the hydroxyl group from other brominated phenolic materials.

Bromination of phenolic compounds in which the para position and at least one ortho position are unsubstituted, usually produces a bromination product rich in the para-bromoisomer. Thus, it is difficult to obtain an ortho-bromo isomer from these starting materials by any direct practical bromination procedures presently known. This is true, for example, in the bromination of m-cresol, the various meta-substituted xylenols, and other lower alkyl substituted phenols. For this reason the ortho isomers are relatively expensive and not readily available as intermediates in the manufacture of known products.

One method for obtaining the desired ortho-isomers is to form a bromination product by conventional means, and convert the brominated materials to the desired ortho-isomers. One method of producing ortho-isomers "indirectly" is disclosed in U.S. Pat. No. 3,293,309. Therein it is said that 2-bromophenol, 6-bromo-o-cresol and 6-bromo-m-cresol are obtained from the corresponding 4-bromo-isomer by heating the latter at a temperature from 100° to 200° C. in the presence of an acidic catalyst for a period of time sufficient for a substantial degree of isomerization to take place. The acidic catalyst is the hydrogen bromide generated in the bromination step or a Friedel-Crafts catalyst such as $AlCl_3$, $AlBr_3$, $FeCl_3$, and the like, or a combination of two or more of these. Best results are reported with a combination of hydrogen bromide and a non-volatile co-catalyst, preferably phosphoric acid. The difficulty with this process is that isomerization is carried out at high temperatures which results in a relatively high concentration of dibrominated and decomposition products. Moreover, in the case of m-alkylphenols, e.g., m-cresol, the isomerization leads to almost equal amounts of the 2-bromo and 6-bromo isomers. Although both isomers are ortho bromo substituted, it is usually desirable to obtain one or the other of these isomers in predominant amounts. The process of the prior art is not satisfactory in such cases. The process is also disadvantageous from the standpoint of the need to handle highly corrosive hot hydrogen bromide.

It is an object of the present invention to provide a new process for the preparation of ortho bromo phenols from other brominated phenolic materials containing at least one phenolic compound in which at least one ortho position is unsubstituted. It is a further object of the invention to provide a process for the enrichment of a brominated m-cresol starting material with respect to the 6-bromo-cresol content thereof.

In accordance with the present invention, it has been discovered that brominated phenolic compounds containing at least one unsubstituted position ortho to the phenolic hydroxyl group can be isomerized to the desired ortho bromo isomer in good yields by allowing the para bromo isomer to "age" at a relatively low temperature in the presence of an inert solvent and hydrogen bromide for a limited period of time. In a further aspect of this invention an unbrominated phenolic material is brominated in the presence of the solvent which is useful during the isomerization and/or disproportionation of the brominated phenolic product to the desired ortho-isomer-rich product.

The process of this invention is distinguished by the fact that the desired conversion (i.e., isomerization and/or disproportionation), and preferably, also the bromination, is conducted in the presence of an inert solvent at relatively low temperatures for a period of time which is sufficient to obtain a high concentration of the desired ortho bromo isomer. In most cases this occurs at equilibrium. However, it is a further distinction of the invention that the maximum concentration of 6-bromo-m-alkylphenols, e.g., 6-bromo-m-cresol, has been found to occur at a timer prior to equilibrium.

One of the essential features of the process of this invention is the use of an inert solvent in the conversion reaction, and preferably also in the bromination reaction. The solvent permits the attainment of the maximum concentration of the desired ortho isomer in the shortest time at the lowest temperature. In the absence of a solvent the conversion to the ortho isomer occurs, but at a very slow and impractical rate at low temperatures.

The solvents of choice are the chlorinated aliphatic and aromatic hydrocarbons and nitro aromatic hydrocarbons. Chloroform is preferred for most substrates. Other suitable solvents include chlorinated benzenes, chlorobenzene, carbon tetrachloride, methylene chloride, tetrachloroethylene, nitrobenzene, and combinations of two or more of these solvents. The amount of solvent used in the reaction mixture can be optimally that amount which will result in a high yield of the desired ortho isomer in a desirably short time at about room temperature. In general, this will be at least one part of solvent for each part by weight of the brominated phenolic starting material, and preferably from about 5 to about 10 parts per part of brominated phenolic starting material, on the same basis.

It has been found that much of the hydrogen bromide generated in the bromination reaction remains in solution and this amount is sufficient to catalyze the conversion to the desired ortho isomers at the temperature envisioned for the process. Although, not necessary to the success of the conversion, additional HBr may be bubbled through the reaction mixture during the interval in which conversion occurs, to maintain a saturated solution of HBr. This latter technique may be desirable when the isomerization and/or disproportionation reaction is conducted at the upper temperatures of the range described below since under these conditions the volatile HBr tends to leave the reaction mixture.

One of the surprising aspects of the process of this invention is that conversion to the ortho isomers occurs and proceeds at a reasonable rate even at low temperatures. Useful results are obtained in the broad range of from about −25° to about 100° C. It is preferred to conduct the isomerization at a temperature in the range of from about −25° to about 60° C., and still more preferably at a temperature in the range of from about 20° to about 30° C.

The present invention is applicable to brominated derivatives of the phenolic compounds of the formula (I):

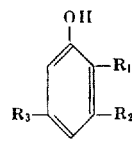

wherein $R_1$, $R_2$ and $R_3$ are hydrogen or primary or secondary alkyl groups (one to four carbon atoms). Included among the phenolic compounds described by the above formula are phenol, ortho-cresol, meta-cresol, 2,3-xylenol, 2,5-xylenol, 3,5-xylenol, ortho ethylphenol, meta ethylphenol, ortho propylphenol, ortho isopropylphenol, ortho butylphenol, ortho isobutylphenol, meta propylphenol, meta isopropylphenol, meta butylphenol, beta isobutylphenol, 2,5-diethylphenol, 2,3-diethylphenol, 3,5-diethylphenol, and the like.

The ortho-bromo phenols which are prepared by the process of this invention are phenols with a free para-position, one bromine atom on the position ortho to the phenolic hydroxyl group and, up to three primary or secondary alkyl substituents. The brominated phenolic starting materials which are useful in the process of the invention may contain only a single phenolic compound or it may be a mixture of unbrominated, monobromo and/or dibrominated phenolic compounds. The mixtures of phenolic materials can be obtained by simply mixing a brominated phenol with one or more brominated and/or unbrominated phenols, or, more usually, by direct bromination of an unbrominated phenolic material. Depending upon bromination conditions, the bromination mixture can contain a variety of compounds ranging from unbrominated starting material to dibrominated compounds and including various part- and ortho-monobrominated phenolic materials. Bromination should not be allowed to proceed beyond the point at which two equivalents of bromine have reacted with each equivalent of the phenolic compound. In general, in fact, if the bromination is being conducted for the purpose of producing starting materials for the process of this invention, it is desirable to brominate to the point where between 0.5 and 1.5, and preferably 1 to 1.3, equivalents of bromine per phenolic equivalent are reacted. This will mean that in the reaction product there is only a small amount of unreacted starting material, a minor amount of dibromo-phenolic materials and a preponderance of mono-brominated material. Such mixtures are eminently suitable for the purposes of this invention.

As has been noted hereinabove, the sources of the brominated phenolic material is not important. Pure materials can be blended to give simulated bromination mixtures or mixtures of brominated derivatives can be formed in situ. For example, it is possible to blend a predominantly dibrominated phenol, with an essentially unbrominated phenol, and, by disproportionation, obtain a mixture which has a desirably high ratio of mono-brominated materials.

When the phenolic compounds of formula I are brominated, the bromine atom is directed predominantly to the para position. In the case of m-cresol, e.g., the concentration of the isomer in the reaction mixture following completion of bromination in the absence of solvent is in the order of about 50–55 mole percent, while the concentration of the 2- and 6-isomers totals about 30 mole percent. The same mixtures, after aging to attain essentially equilibrium conditions, contains about 20 mole percent of each of the 2- and 6-isomers and 26 mole percent of the 4-isomer. Though not previously recognized, the concentration of the 6-bromo isomer is greater at an intermediate time after bromination, but before equilibrium of the bromination mixture has been achieved.

It has been found that the isomerization of the para bromo phenols proceeds to the equilibrium state in a relatively short time when the reaction is conducted according to this invention. The maximum concentration of the ortho bromo isomer is normally attained at equilibrium. However, it has been discovered that the isomerization of 4-bromo-m-cresol proceeds to equilibrium through an intermediate maximum concentration of the 6-bromo-m-cresol. At equilibrium the 2- and 6-isomers are present in approximately equal concentrations. This intermediate maximum concentration represents about 38 percent of the 6-bromo-m-cresol after 48 hours at 25° C. when the isomerization is conducted in a solvent consisting of 4 parts of chlorobenzene and one part of carbon tetrachloride. The equilibrium concentration is about 20 percent.

The bromination reaction is conducted under conventional conditions, preferably using at least a stoichiometric amount of bromine. When stoichiometric quantities of bromine are used, the reaction mixture will usually contain some unreacted phenolic material. For example, when bromo-m-cresol reaction mixture is allowed to stand in the presence of HBr, some of the mono-brominated product is debrominated to m-cresol and bromine. As a result there is an increase in concentration of dibromo isomers (2,4-, 2,6- and 4,6-) by reaction of the bromine with the monobrominated product. Thus, when the desired quantity of the ortho isomer is attained, additional bromine may be added to the reaction mixture to brominate the remaining unbrominated cresol prior to separation of the product.

As noted above, it has also been discovered in accordance with this invention that dibrominated products resulting from the bromination of the phenolic compounds of this invention, specifically the 2,4- and 4,6-dibromo-m-alkylphenols can be converted to the corresponding ortho bromo isomer by disproportionation of a mixture of the dibromo compounds with an unbrominated phenolic compound, preferably an equimolar quantity of the corresponding unbrominated phenolic compound, in the presence of HBr. Thus a mixture of m-cresol and 2,4-, and 4,6-dibromo-m-cresols can be disproportionated, resulting in the formation of the desired 2-bromo and 6-bromo-m-cresols.

When the maximum amount of the desired isomer has been obtained, the reaction mixture is drowned in an alkaline medium, e.g., aqueous sodium hydroxide. The aqueous layer containing the phenolic compounds is withdrawn and neutralized with an acid. The product portion is then separated and distilled in vacuo to obtain the ortho bromo isomers. In the case of m-cresol the 2- and 6-bromo isomers have similar boiling points, and are not easily separated by distillation; they may be separated by forming the benzene or paratoluene-sulfonates, separating the sulfonates by crystallization, recrystallizing and finally hydrolyzing the sulfonate to the desired brominated phenolic compound. Other suitable isolation techniques can be used.

The following examples are presented to further illustrate this invention. In all the examples where pertinent vapor phase chromatographic data are given, the following system was used unless otherwise noted.

Column: 6 ft. 20 percent Carbowax 20M on Chromosorb W; 60/80 mesh
Detector: Thermal conductivity
Carrier gas: Helium
Flow rate: 200 ml./min.
Temperature: Injection port-200° C.; Block-255° C.
Column:
  a) 135° C. for separation of 2-bromo-m-cresol, 6-bromo-m-cresol and m-cresol.
  b) 175°-200° C. for separation of dibromo-m-cresols and 4-bromo-m-cresol from the above.

Samples were treated with sodium carbonate prior to analysis. Peak areas were calculated by the method of triangles and gave mole percent directly.

EXAMPLE 1

Bromination and Isomerization of m-Cresol Without Solvent m-Cresol was brominated according to the procedure of Example 8 of U.S. Pat. No. 3,293,309.

m-Cresol was brominated at 55°-65° C. with an equivalent of bromine added as a gas carried by a stream of nitrogen. The reaction mixture was then heated to 145°-155° C. for 6 hours in the presence of residual hydrogen bromide to determine the extent of isomerization. The mixture was then heated an additional 6 hours at the same temperature after addition of 1 percent by weight of phosphoric acid and with a stream of hydrogen bromide bubbling through the liquid. The composition in terms of mole percentages of the isomers (1) after the bromination, (2) after the first period of heating and (3) after the addition of phosphoric acid and the second period of heating the mixture saturated with hydrogen bromide, are listed below. Vapor phase chromatographic (VPC) analysis of the reaction mixture was compared with the analysis reported in Example 8 of the above cited patent.

TABLE I

|  | Analysis shown in U.S. 3,293,309 | | | Analysis by VPC | | |
|---|---|---|---|---|---|---|
| Component | (1) | (2) | (3) | (1) | (2) | (3) |
| m-cresol | 5.7 | 6.4 | 16.5 | 9.4 | 10.5 | 19.5 |
| 2-bromo-m-cresol | — | — | — | 7.6 | 9.2 | 19.6 |
| 6-bromo-m-cresol | 32.8 | 39.5 | 41.6 | 22.0 | 26.0 | 20.0 |
| 4-bromo-m-cresol | 51.5 | 42.3 | 23.1 | 53.5 | 44.5 | 26.4 |
| 4,6-dibromo-m-cresol | 10.0 | 11.5 | 16.9 | — | — | — |
| dibromo (2,4 + 4,6) m-cresol | — | — | — | 7.5 | 9.8 | 14.5 |
| others | — | — | 1.9 | — | — | — |

This example illustrates (a) that the concentration of the 6-isomer does not significantly change in the process whereas the concentration of the 2-isomer is more than doubled, (b) that the state achieved in step (3) is approximately the equilibrium condition, and (c) that the optimum concentration of the 6-isomer is not obtained unless the aging step is of limited duration.

EXAMPLE 2

Bromination of m-Cresol m-Cresol was brominated at 25° C. in chloroform using a 24% stoichiometric excess of bromine as follows:

20 Grams (0.185 mole) of m-cresol were dissolved in 80 ml. of chloroform. A solution of 36.7 grams (0.229 mole) of bromine in 80 ml. of chloroform was added dropwise to the m-cresol solution over 2 hours at 25° C. The flask was then stoppered and allowed to stand at 25° C.

Analysis of the reaction mixture was made periodically throughout the reaction. These data are shown below in tabular form (Table II).

TABLE II.—BROMINATION OF m-CRESOL

Variation of composition with time (mole percent)

|  | Time (hrs.) | m-Cresol | 2-bromo | 6-bromo | 2- + 6- | Di-bromo | 4-bromo |
|---|---|---|---|---|---|---|---|
| Bromination | 0 | 100 | 0 | 0 | .0 | 0 | 0 |
|  | 0.5 | 63 |  |  | 4.1 | 4.7 | 28.2 |
|  | 1.0 | 38.5 |  |  | 9.1 | 4.4 | 48.0 |
|  | 1.5 | 13.6 |  |  | 16.9 | 9.4 | 60.0 |
|  | 2.0 | 0 |  |  | 22.0 | 19.2 | 58.8 |
| Isomerization | 0 | 0 | 3.2 | 18.8 | 22.0 | 19.2 | 58.8 |
|  | 1 | 4.4 |  |  | 26.5 | 20.9 | 48.2 |
|  | 3 | 6.2 |  |  | 34.6 | 24.2 | 34.0 |
|  | 5 | 6.4 | 8.6 | 28.8 | 37.4 | 24.8 | 31.5 |
|  | 8 | 7.2 | 12.0 | 30.2 | 42.2 | 23.1 | 27.0 |
|  | 22 | 8.7 | 20.0 | 27.8 | 47.8 | 22.2 | 21.2 |
|  | 140 | 11.2 | 19.7 | 20.2 | 39.9 | 31.2 | 17.7 |
|  | 266 | 11.0 | 20.1 | 20.7 | 40.8 | 28.9 | 18.8 |

It is clear from the data that the concentration of the 6-isomer increases from 18.8 mole percent of the reaction mixture after completion of the bromination, to a maximum of 30.2 mole percent after allowing the reaction mixture to stand at 25° C. for 8 hours in the presence of residual hydrogen bromide. Continued isomerization under the same conditions results in a reduction of the 6-isomer content, the entire mixture approaching the equilibrium state. The maximum concentration of the 2-isomer occurs at equilibrium.

EXAMPLE 3

Hydrogen bromide was bubbled through a crude mixture of bromo-m-cresol at 0°-5° C. for five minutes. The ice bath was removed and the mixture allowed to warm to room temperature in a stoppered flask. The mixture solidified and was allowed to stand at room temperature for 6 hours and then heated on a steam bath in vacuo to liquify the solid and remove HBr. The liquid was again saturated with HBr and allowed to stand at room temperature for a total of 96 hours. Analysis of the mixtures by vapor phase chromatography showed the following compositions (Table III):

TABLE III

| Aging Time | Mole % | | | |
|---|---|---|---|---|
| | 2- + 6-isomer | m-cresol | dibromo | 4-isomer |
| 0 | 23.2 | 1.4 | 16.3 | 59.1 |
| After 6 hours | 22.9 | 3.0 | 16.9 | 57.1 |
| After 96 hours | 26.8 | 12.0 | 24.1 | 36.6 |

This example illustrates the slow rate of increase in ortho-isomer content when the isomerization is conducted in the absence of solvent at a low temperature.

EXAMPLE 4

Bromination of m-Cresol m-Cresol (20 g., 0.185 mole) was dissolved in a mixture of 80 ml. of chlorobenzene and 20 ml. of carbon tetrachloride. To this solution was added a solution of bromine (29.6 g., 0.185 mole) in 80 ml. of chlorobenzene and 20 ml. of carbon tetrachloride over 6 hours at 25° C. The solution was then allowed to stand at 25° C. in a stoppered flask and samples were removed periodically for VPC analysis with the following results (Table IV):

TABLE IV

| Aging Time (hrs.) | mole % | | | | |
|---|---|---|---|---|---|
| | m-cresol | 2-Br | | dibromo | 4-Br |
| 0 | 5.9 | 3.6 | 16.8 | 2.0 | 71.6 |
| 16 | 8.2 | 8.8 | 33.4 | 4.1 | 45.4 |
| 24 | 8.6 | 9.8 | 36.7 | 4.5 | 40.4 |
| 48 | 9.1 | 12.8 | 38.2 | 5.5 | 34.4 |
| 66 | 10.0 | 14.2 | 38.2 | 6.0 | 31.5 |
| 138 | 10.5 | 17.1 | 36.3 | 7.6 | 28.6 |

EXAMPLE 5

Isomerization of p-Bromophenol with Hydrogen Bromide p-Bromophenol (4.63 grams, 0.027 mole) was dissolved in 23 ml. of chloroform. The solution was saturated with anhydrous HBr and allowed to stand at 25° C. in a stoppered flask. Samples were analyzed by VPC.

| Time, hrs. | o-bromo Phenol | Phenol | Dibromo-phenols | p-Bromo-phenol |
|---|---|---|---|---|
| 0 | 0 | 0 | 0 | 100 |
| 120 | 20 | 6 | 6 | 68 |
| 483 | 44 | 6 | 8 | 42 |
| 1032 | 49 | 7 | 10 | 34 |

This example illustrates the applicability of the process of the invention to phenolic compounds which do not contain a meta-alkyl group.

EXAMPLE 6

Isomerization of 4-Bromo-3,5-Dimethylphenol

4-Bromo-3,5-dimethylphenol (5.43 g., .027 mole) was dissolved in 44 ml. of chloroform. This solution was saturated with anhydrous HBr and allowed to stand at 25° C. in a stoppered flask. Samples were removed periodically for VPC analysis.

| Time | 3,5-di-methyl phenol | 2-bromo-3,5-dimethylphenol | 4-bromo-3,5-dimethylphenol | dibromo-3,5-dimethylphenol | |
|---|---|---|---|---|---|
| | | | | 2,4- | 2,6- |
| 0 | 0.4 | — | 98.4 | 1.2 | — |
| 5 min. | 6.5 | 54.4 | 30.9 | 8.2 | — |
| 0.5 | 7.5 | 63.7 | 17.9 | 10.8 | trace |
| 1 | 8.9 | 65.8 | 15.6 | 9.6 | trace |
| 4 | 9.7 | 64.3 | 15.7 | 9.9 | 0.5 |
| 24 | 10.2 | 64.1 | 14.7 | 8.6 | 2.2 |
| 48 | 10.1 | 61.9 | 16.0 | 8.3 | 3.7 |
| 72 | 10.9 | 57.2 | 17.2 | 9.5 | 5.1 |

Column: 6 ft. 10% UC-W98 (Silicone rubber)
Column temperature: 150-200°C., programmed at 6° per min.
Helium flow rate: 45 ml./min.

This example illustrates the applicability of the process of the invention to other phenolic compounds wherein the predominating 4-bromo isomer is isomerized to the desired ortho isomer.

EXAMPLE 7

Isomerization of 4-Bromo-m-Cresol in Nitrobenzene

4-Bromo-m-cresol (5.0 g., 0.207 mole) was dissolved in 23 ml. of nitrobenzene. The solution was saturated with anhydrous HBr and allowed to stand at 25° C. in a stoppered flask. Samples were removed periodically for VPC analysis.

| Time, hr. | 2-bromo-m-cresol | 6-bromo-m-cresol | m-cresol | dibromo-m-cresol | 4-bromo-m-cresol |
|---|---|---|---|---|---|
| 0 | 0 | 0 | 0 | 0 | 100 |
| 4 | (1)* | | 5 | 5 | 89 |
| 24 | 2 | 13 | 6 | 6 | 73 |
| 96 | 8 | 20 | 10 | 10 | 52 |
| 144 | (27)* | | 12 | 12 | 49 |
| 192 | (25)* | | 13.5 | 13.5 | 48 |
| 264 | (25)* | | 15 | 15 | 45 |
| 360 | 11 | 14 | 16 | 16 | 44 |
| 624 | 12 | 13 | 16 | 16 | 43 |

*Parenthetical values refer to sum of 2-bromo and 6-bromo isomers.

This example illustrates the applicability of the process of the invention in solvents other than chlorinated hydrocarbons; in particular, nitrobenzene.

EXAMPLE 8

Conversion of a Mixture of Dibromo-m-Cresols and m-Cresol

A solution of 5 g. of m-cresol in 20 ml. of chloroform was treated with two equivalents of bromine in 20 ml. of chloroform over a period of 1 hour at 25° C. To this mixture was then added 5 grams of m-cresol in 10 ml. of chloroform, and the mixture allowed to stand in a stoppered flask at 25° C. Samples for VPC analysis were taken (A) after bromination, (B) after adding m- cresol, and (C) periodically during the isomerization.

| Time, hrs. | 2-bromo | 6-bromo | m-cresol | 2,4- and 4,6- dibromo | 4-bromo |
|---|---|---|---|---|---|
| (A) | (2)* | | 0 | 90 | 8 |
| (B) | — | | 49 | 46 | 5 |
| 3.5 | (6)* | | 41 | 48 | 5 |
| 21.5 | (20)* | | 35 | 34 | 11 |
| 46.5 | (30)* | | 28 | 26 | 15 |
| 93 | 15 (32)* | 17 | 26 | 23 | 19 |
| 123 | 16 (33)* | 17 | 25 | 22 | 20 |
| 460 | 21 (42)* | 21 | 22 | 16 | 20 |

*Parenthetical values refer to sum of 2-bromo and 6-bromo isomers.

This example illustrates the applicability of the process of the invention to disproportionated dibrominated-m-cresols/m-cresol mixtures with the resultant preparation of the ortho bromo isomers.

I claim:

1. A process for preparing ortho-substituted bromophenols comprising aging a solution of a brominated phenol, wherein the phenol prior to bromination has the formula;

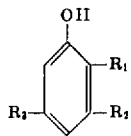

wherein $R_1$, $R_2$ and $R_3$ are hydrogen or primary or secondary alkyl groups of 1 to 4 carbon atoms; wherein the said aging of said bro-minated phenol is performed by aging a solution of the said brominated phenol with hydrogen bromide in an inert solvent at a temperature in the range of −25°C. to about 60°C to increase the ortho bromo phenolic concentration.

2. A process as defined in claim 1 wherein said solution is in an inert solvent selected from the group consisting of chlorinated hydrocarbons and nitrobenzene.

3. A process as defined in claim 1 including the additional step of stopping the aging step by adding to said solution a basic material to react with the hydrogen bromide in said solution.

4. A process as defined in claim 3 including the further step of separating the desired ortho-substituted bromophenol from the mixture of products thus obtained.

5. A process as defined in claim 1 wherein said phenol is m-cresol, xylenol, or phenol.

6. A process for preparing ortho-substituted bromophenols comprising brominating a phenol of the formula:

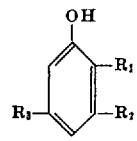

wherein $R_1$, $R_2$, and $R_3$ are hydrogen or primary or secondary alkyl groups of 1 to 4 carbon atoms, aging a solution in inert solvent of the resultant bromination products with hy-drogen bromide at a temperature in the range of about −25°C. to about 60°C. to increase the proportion of ortho-substi-tuted bromophenols therein, stopping the aging step by add-ing to said solution a basic material to react with the hy-drogen bromide in said solution, and separating the desired ortho-substituted bromophenol therefrom.

7. A process as defined in claim 6 wherein said bromination step and said aging step are both performed in solution in the same inert solvent.

8. A process as defined in claim 7 wherein said inert solvent is a chlorinated hydrocarbon.

9. A process as defined in claim 8 wherein said phenol is m-cresol, xylenol, or phenol.

10. A process as defined in claim 8 wherein said phenol is m-cresol and wherein 6-bromo-m-cresol is separated in the last step thereof.

* * * * *

Case 22,401

UNITED STATES PATENT OFFICE
CERTIFICATE OF CORRECTION

Patent No. 3,681,467        Dated August 1, 1972

Inventor(s) Edward John O'Bara

It is certified that error appears in the above-identified patent and that said Letters Patent are hereby corrected as shown below:

Col. 2, line 13, "timer" should read -- time --.

Col. 3, line 30, "part-" should read -- para- --.

Col. 7, line 39, insert as a heading over the fourth column in Table IV "6-Br".

Col. 8, line 34, "0.207" should read -- 0.027 --.

Signed and sealed this 20th day of March 1973.

(SEAL)
Attest:

EDWARD M. FLETCHER, JR.
Attesting Officer

ROBERT GOTTSCHALK
Commissioner of Patents